United States Patent [19]

Morgan et al.

[11] 4,058,658
[45] Nov. 15, 1977

[54] COPOLYMERS OF ω-BROMOALKYL ESTERS OF ACYCLIC UNSATURATED DICARBOXYLIC ACIDS

[75] Inventors: Albert W. Morgan, Collinsville, Ill.; Charles S. Shull; William Vanderlinde, both of St. Louis, Mo.

[73] Assignee: Monsanto Company, St. Louis, Mo.

[21] Appl. No.: 642,929

[22] Filed: Dec. 22, 1975

[51] Int. Cl.² .................... C08F 4/32; C08F 26/06; C08F 126/10; C08F 210/00

[52] U.S. Cl. .................... 526/261; 544/190; 260/31.8 XA; 260/45.7 RT; 260/45.8 NZ; 260/890; 260/897 C; 526/232; 526/264; 526/292; 560/156

[58] Field of Search .................... 526/261, 264, 292; 260/248 CS, 485 H

[56] References Cited

U.S. PATENT DOCUMENTS

| | | | |
|---|---|---|---|
| 2,510,503 | 6/1950 | Kropa | 526/261 |
| 3,053,812 | 9/1962 | D'alelio | 526/261 |
| 3,108,987 | 10/1963 | Galli et al. | 526/261 |

FOREIGN PATENT DOCUMENTS

| | | | |
|---|---|---|---|
| 161,506 | 2/1955 | Australia | 260/485 H |

*Primary Examiner*—Herbert J. Lilling
*Attorney, Agent, or Firm*—R. E. Wexler; N. E. Willis; G. R. Beck

[57] ABSTRACT

Copolymers are prepared from ω-bromoalkyl ester of acyclic unsaturated dicarboxylic acids and compounds copolymerizable therewith. The copolymers are useful as flame retardant plasticizers for polymers.

8 Claims, No Drawings

COPOLYMERS OF ω-BROMOALKYL ESTERS OF ACYCLIC UNSATURATED DICARBOXYLIC ACIDS

BACKGROUND OF THE INVENTION

This invention relates to novel copolymers wherein one of the monomers is an ω-bromoalkyl ester of an acyclic unsaturated dicarboxylic acid.

Further, this invention relates to plasticized polymer compositions containing said novel copolymers as flame retardant plasticizers.

Still further, this invention relates to novel plasticizer compositions comprising a copolymer wherein one of the monomers is an ω-bromoalkyl ester of an acyclic unsaturated dicarboxylic acid.

SUMMARY OF THE INVENTION

In accordance with the present invention, there are provided flame retardant plasticizer compositions for natural and synthetic polymers which comprise a copolymer of an ω-bromoalkyl ester of an acyclic unsaturated dicarboxylic acid and a monomer copolymerizable therewith. The ω-bromoalkyl ester copolymers are characterized by the formula

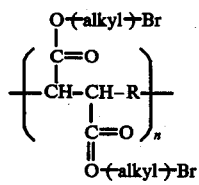

wherein R is the incorporated residue, i.e., monomeric unit derived from the polymerization of an ethylenically unsaturated comonomer and n has a value of from about 10 to about 2,000, corresponding to a molecular weight distribution of from about 2,000 to about 350,000

SPECIFIC EMBODIMENTS OF THE INVENTION

The novel copolymeric flame retardant plasticizers which are embodied by the present invention are based on copolymers of an ω-bromoalkyl ester of an acyclic unsaturated dicarboxylic acid and a copolymerizable monomer.

The ω-bromoalkyl esters utilized in the preparation of the novel copolymers of the present invention are represented by the formula

wherein n represents 0 to 4; n' represents 0 to 4; x represents 1 to 8; and x' represents 1 to 8. Preferably, x and x' are the same.

The ω-bromoalkyl esters are prepared by the reaction of the appropriate acid or acid anhydride with the appropriate brominated alcohol or equivalent.

Illustrative acids and acid anhydrides which are utilized to prepare the ω-bromoalkyl esters include ethenedioic acid, propenedioic acid, butenedioic acid, pentenedioic acid, hexenedioic acid, octenedioic acid, nonendioic acid and decenedioic acid.

Illustrative ω-bromoalkyl esters of the described acids include the bis(bromomethyl)ester, the bis(2-bromoethyl) ester, the bis(3-bromopropyl)ester, the bis(4-bromobutyl)ester, the bis(5-bromoamyl)ester, the bis(6-bromohexyl)ester, the bis(7-bromoheptyl)ester, and the bis(8-bromooctyl)ester.

Representative ω-bromoalkyl esters of acyclic unsaturated acids which are embodied by the present invention include bis(bromomethyl)ester of ethenedioic acid, bis(2-bromoethyl)ester of ethenedioic acid, bis(3-bromopropyl)ester of ethenedioic acid, bis(4-bromobutyl)ester of ethenedioic acid, bis(bromomethyl)ester of propenedioic acid, bis(5-bromoamyl) ester of propenedioic acid, bis(2-bromoethyl)ester of butenedioic acid, bis(4-bromobutyl)ester of butenedioic acid, bis(3-bromopropyl)ester of pentenedioic acid, bis(bromomethyl) ester of pentenedioic acid, bis(6-bromohexyl)ester of hexenedioic acid, bis(4-bromobutyl)ester of hexenedioic acid, bis(bromometyl)ester of heptenedioic acid, bis(7-bromoheptyl) ester of octenedioic acid, bis(2-bromoethyl)ester of nonenedioic acid, bis(3-bromopropyl)ester of nonenedioic acid, bis(8-bromooctyl)ester of decenedioic acid, and the like. Especially preferred as a coreactant with a copolymerizable monomer is the bis(4-bromobutyl)ester of ethenedioic acid, i.e., bis(4-bromobutyl)fumarate.

Brominated alcohols which are reacted with the abovedescribed acids to afford the ω-bromoalkyl esters which are utilized to prepare the copolymers of the present invention include bromomethanol, 2-bromoethanol, 3-bromopropanol, 4bromobutanol, 5-bromopentanol, 6-bromohexanol, 7-bromoheptanol, and 8-bromooctanol. Additionally, there may be used precursor materials which are converted in situ into the appropriate bromoalcohol. For instance, tetrahydrofuran is converted into 4-bromobutanol in the presence of hydrogen bromide. Other materials which may be used in lieu of the appropriate bromoalcohol are ethylene oxide and 1,3-propylene oxide. Ethylene oxide is converted to bromoethanol and 1,3-propylene oxide is converted into 3-bromopropanol in the presence of HBr.

The ω-bromoalkyl esters described above are reacted with copolymerizable ethylenically unsaturated monomers. Copolymerizable ethlenically unsaturated comonomers may be determined by reference to published copolymerization reactivity ratios. The relation between the composition of a monomer mixture and the copolymer formed from it is determined by the monomer reactivity ratios of the particular monomer pair. An ideal copolymerization reaction is one wherein the reactivity value of one monomer $(r_1)$ times the reactivity of the second monomer $(r_2)$ equals 1 (i.e., $r_1 r_2 = 1$). Since copolymerization only randomly would approach ideal conditions, two monomers whose multiplied reactivity values equal less than one are considered to be copolymerizable.

The reactivity value of numerous polymerizable monomers has been experimentally determined (see CHEMICAL REVIEWS, Vol. 46, Mayo and Walling, pp. 212–222; and ENCYCLOPEDIA OF POLYMER SCIENCE AND TECHNOLOGY, Vol. 4, pp. 193–222). From such reactivity values, a determination may be made as to whether two monomers are copolymerizable.

The reactivity value of ω-bromoalkyl esters has not been determined. Therefore, in order to determine possible monomers which would copolymerize with the ω-bromoalkyl esters, e.g., bis(4-bromobutyl)fumarate, it was decided to utilize the compound closest thereto for which the reactivity value had been found, and thus determine which monomers would copolymerize therewith in accordance with published reactivity values. Accordingly, diethyl fumarate was chosen as the closest compound to the ω-bromoalkyl esters of the invention for which a reactivity value had been determined, and certain monomers copolymerizable therewith were chosen in accordance with published values. The monomers initially chosen were diallyl phthalate, methyl methacrylate, N-vinyl pyrrolidone, allyl alcohol, acrylonitrile, acrylamide, ethyl acrylate, triallyl cyanurate and vinyl acetate. It was believed that, since reactivity ratios indicated such monomers would copolymerize with diethyl fumarate, they would also copolymerize with ω-bromoalkyl esters such as bis(4-bromobutyl)-fumarate. Subsequent experiments proved that such monomers would, in fact, copolymerize with ω-bromoalkyl esters such as bis(4-bromobutyl)fumarate. Accordingly, it is considered that any ethylenically unsaturated compound whose reactivity value multiplied by the reactivity value of diethyl fumarate is less than 1 would copolymerize with the described ω-bromoalkyl esters. Accordingly, the following compounds are considered illustrative of ethylenically unsaturated monomers which will copolymerize with the desired ω-bromoalkyl esters: diallyl phthalate; alkyl methacrylates, e.g., methyl methacrylate; N-vinyl pyrrolidone; allyl alcohol, acrylonitrile; acrylamide; alkyl acrylates, e.g., ethyl acrylate; triallyl cyanurate; vinyl esters of lower acyclic carboxylic acids, e.g., vinyl acetate; conjugated diolefins, e.g., butadiene, 2-chloro-1,3-butadiene; vinyl aromatics, e.g., styrene; vinyl chloride; vinylidene chloride, and the like. Preferred comonomers are triallyl cyanurate, vinyl acetate and ethyl acrylate.

In general, the ω-bromoalkyl esters and comonomers are copolymerized by initially heating a mixture of the appropriate ω-bromoalkyl ester and a free radical catalyst, such as t-butyl perbenzoate, azobis isobutyronitrile, or benzoyl peroxide, at a temperature of about 45° C. for approximately 1 hour. The temperature is then raised to 75° – 120° C. and comonomer is charged slowly and additional catalyst may be added. Continuous IR analysis indicates attainment of the desired degree of copolymerization.

The molar ratio of ω-bromoalkyl ester to comonomer in the reaction mixture is, generally, from about 1:1 to about 20:1. Preferably, the ratio is from about 2:1 to about 7:1.

The copolymer flame retardant plasticizers described above may be used as the sole plasticizer in polymer formulations but may also be used in conjunction with conventional plasticizers, such as the widely used phthalate and phosphate plasticizers. Thus, the fire retardant plasticizers described may be used in combination with phosphate esters such as trialkyl phosphates, dialkylaryl phosphates, alkyldiaryl phosphates and triaryl phosphates, e.g., tributyl phosphate, trioctyl phosphate, and trialkyl phosphate prepared from mixtures of $C_7 - C_9 - C_{11}$ alcohols, dioctylphenyl phosphate, diisodecylphenyl phosphate, isopropylphenyl diphenyl phosphate, octyldiphenyl phosphate, t-butylphenyl diphenyl phosphate, isodecyl diphenyl phosphate, cumylphenyl diphenyl phosphate, triphenyl phosphate, cresyl diphenyl phosphate, tricresyl phosphate and the like. Similarly, conventional phthalate plasticizers may be used in the polymer compositions described in the present invention, e.g., dialkyl phthalates wherein the alkyl portion of the ester radical contains from 2 to 11 carbon atoms, i.e., from mixtures of $C_7 - C_9 - C_{11}$ alcohols. Further, mixed phthalate esters containing an alkyl ester portion and an aryl ester portion are contemplated, e.g., butylbenzyl phthalate and similar materials. The flame retardant plasticizers of the present invention, whether alone or in combination with conventional plasticizers, are normally incorporated into polymer systems which may contain other conventional formulating additives such as fillers, stabilizers, colorants, antioxidants, foaming agents and the like.

Depending upon the particular polymer plasticized and the specific copolymer plasticizer utilized, and also depending on whether such plasticizer is used along or in conjunction with conventional plasticizers, the flame retardant plasticizers of this invention may be incorporated at various concentrations. In general, the copolymer plasticizers described are utilized at concentrations of from about 1 to about 100 phr (i.e., parts per hundred parts of resin), preferably from about 10 to about 40 phr.

The following examples illustrate specific, nonlimiting embodiments of the invention.

In the following examples, certain tests are made, certain terms are used and comparisons are made on the basis of those tests. Accordingly, the following definitions will serve as the basis of an understanding of the tests utilized in the examples:

1. "Oxygen Index" — this test uses the procedure of ASTM-D2863-74 which employs a vertical glass tube 60 cm. high and 8.4 cm. in diameter, in which a rod or strip specimen 8 cm. long is held vertically by a clamp at its bottom end. A mixture of oxygen with another gas or gases, usually nitrogen, is metered into the bottom of the tube, passing through a porous metal plate at the bottom to smooth the flow of gas. The sample is ignited at its upper end by a methane flame which is then withdrawn, and the atmosphere that permits steady burning down of the specimen is determined. The limiting oxygen index is the minimum fraction of oxygen in an oxygen-nitrogen mixture which will just permit the sample to burn. The results are shown as the minimum concentration of oxygen, expressed as volume percent, which will just support combustion. The higher the oxygen index, the less flammable is the material.

2. "UL-94" test is utilized to determine the resistance of a plastic material to continued combustion and to ignition. In this test, a standard specimen is supported from the upper 6.4 mm. of the specimen, with the longitudinal access vertical, by a clamp on a ring stand so that the lower end of the specimen is 9.5 mm. above the top of the burner tube and 305 mm. above a horizontal layer of dry absorbant surgical cotton. The burner is placed remote from the specimen, ignited and adjusted to produce a blue flame 19 mm. high. The test flame is placed centrally under the lower end of the test specimen and allowed to remain for 10 seconds. The test flame is then withdrawn and the duration of the flaming of the specimen noted. When the flaming of the specimen ceases, the test flame is immediately placed again under the specimen. After 10 seconds, the test flame is again withdrawn and the duration of flaming and glowing noted.

In this procedure, V-0 is the highest rating obtainable. It indicates an average burn time of less than 50 seconds (2 ignitions for each of 5 specimens), no one burn of greater than 10 seconds, no dripping flame and no afterglow beyond 30 seconds after the second removal of the flame. A rating of V-1 allows up to 250 seconds average burn time and a V-2 rating indicates the sample drips and flames.

EXAMPLE I

This example illustrates the preparation of bis(4-bromobutyl)fumarate. In place of 4-bromobutanol, there was used tetrahydrofuran which is converted to 4-bromobutanol in situ by HBr.

To a 1-liter reactor, equipped with thermometer and condenser, there were added 99.6 g. (1.02 moles) maleic anhydride, 162 g. (2.25 moles) tetrahydrofuran and 4 g. p-toluenesulfonic acid. Hydrogen bromide (177.4 g., 2.19 moles) was added substrate over a period of 1.75 hours while the temperature was held at approximately 70° C.

Benzene (40 g.) was then added and the mixture was heated to reflux (approximately 95° C.) and water of esterification was removed as formed, during which time the reaction temperature rose to approximately 130° C.

The reaction mixture was cooled and the pH adjusted to 9.0 by addition of aqueous sodium carbonate.

Separation of bis(4-bromobutyl)fumarate and refining afforded a yield of 378 g. Due to the time required for complete reaction (1.75 hours for HBr addition and 4 hours heatup and reflux) and the acid pH of the reaction mixture, maleate compounds formed were isomerized to the fumarate form.

In the same manner, other ω-bromoalkyl esters may be prepared by reacting the appropriate anhydride with the appropriate bromoalkanol.

Thus, the following esters may be prepared:
bis(bromomethyl)fumarate
bis(2-bromoethyl)fumarate
bis(3-bromopropyl)fumarate
bis(5-bromopentyl)fumarate
bis(6-bromohexyl)fumarate
bis(7-bromoheptyl)fumarate
bis(8-bromooctyl)fumarate
bis(2-bromoethyl)ester of propenedioic acid
bis(4-bromobutyl)ester of butenedioic acid
bis(5-bromopentyl)ester of decenedioic acid

EXAMPLE II

This example illustrates the preparation of a copolymer of bis(4-bromobutyl)fumarate and triallyl cyanurate.

To a 500 ml. flask, equipped with agitator, thermometer, dropping funnel and gas inlet tube, there were charged 98.2 g. bis(4-bromobutyl)fumarate. Heat was applied to raise the temperature to about 45° C., agitation was begun and 1 g. t-butyl perbenzoate was added. The temperature was then raised to approximately 110° C. After one hour, 1.9 g. triallyl cyanurate was added over a 1 hour period. After addition of the comonomer, reaction temperature was held at approximately 110° C. until IR analysis indicated the desired degree of copolymerization was obtained. Yield of copolymer was 98.93 g.

Continuous IR analyses are conducted during the course of the copolymerization, as are viscosity determinations. Generally, the copolymerization reaction is terminated when the degree of conversion, as measured by viscosity, is such that the product is a free-flowing viscous liquid at 25° C.

In the same fashion, preparation of the following copolymers are contemplated:
bis(bromomethyl)fumarate/styrene
bis(2-bromoethyl)fumarate/diallyl phthalate
bis(3-bromopropyl)fumarate/methyl methacrylate
bis(4-bromobutyl)fumarate/acrylonitrile
bis(5-bromopentyl)fumarate/N-vinyl pyrrolidone
bis(6-bromohexyl)fumarate/allyl alcohol
bis(7-bromoheptyl)fumarate/acrylamide
bis(8-bromooctyl)fumarate/vinyl acetate
bis(4-bromobutyl)ester of butenedioic acid/ethyl acrylate
bis(2-bromoethyl)ester of hexenedioic acid/triallyl cyanurate
bis(3-bromopropyl)ester of octenedioic acid/vinyl acetate
bis(5-bromopentyl)ester of decenedioic acid/triallyl cyanurate

EXAMPLE III

This example illustrates the preparation of a copolymer of bis(4-bromobutyl)fumarate and vinyl acetate.

To a 500 ml. flask, equipped with agitator, thermometer, dropping funnel, gas inlet tube and condenser, were charged 250 g. (0.647 mole) bis(4-bromobutyl)fumarate under nitrogen atmosphere. The temperature was raised to 45° C. at which time the agitator was turned on and 1 g. of benzoyl peroxide was added. The reaction mixture was then heated to approximately 80° C. and held for one hour. Addition of 8.9 g. vinyl acetate was started and continued over 2.5 hours. The reaction mass was then held at a temperature of approximately 80° C. until IR analysis indicated that the desired degree of copolymerization reaction was obtained. There was afforded 235 g. of a copolymer of bis(4-bromobutyl)fumarate and vinyl acetate.

In the same fashion, preparation of the following copolymers is contemplated:
bis(bromomethyl)ester of propenedioic acid/vinyl acetate
bis(2-bromoethyl)ester of propenedioic acid/methyl methacrylate
bis(2-bromoethyl)ester of butenedioic acid/butyl methacrylate
bis(4-bromobutyl)ester of butenedioic acid/propyl acrylate
bis(4-bromobutyl)ester of pentenedioic acid/vinyl fumarate
bis(bromomethyl)ester of hexenedioic acid/butadiene
bis(4-bromobutyl)fumarate/3-chlorobutadiene-1,3
bis(4-bromobutyl)fumarate/styrene
bis(4-bromobutyl)fumarate/vinyl chloride

EXAMPLE IV

This example illustrates the preparation of a copolymer of bis(4-bromobutyl)fumarate and ethyl acrylate.

To a 500 ml. flask, equipped with agitator, thermometer, dropping funnel and condenser, were charged 167.6 g. bis(4-bromobutyl)fumarate under nitrogen atmosphere. The temperature was raised to approximately 60° C. and 3.95 g. benzoyl peroxide was added during agitation. The reaction mixture temperature was raised to about 80° C. over one hour and dropwise addition was begun of a solution of 30 g. ethyl acrylate in 30 g. benzene. Addition of ethyl acrylate was complete after about 3 hours. The reaction mixture was then held at a temperature of approximately 80° C. until IR analysis indicated that the desired degree of copolymerization was obtained. There was afforded 180.8 g. of a copolymer of bis(4-bromobutyl)fumarate and ethyl acrylate.

EXAMPLE V

This example illustrates the effectiveness of a copolymer of bis(4-bromobutyl)fumarate and vinyl acetate as a flame retardant plasticizer for polyethylene.

Polyethylene (55 g.) was processed in a Brabender mixing head at 180° C. until fused. There was then prepared an 0.32 cm. thick molded sheet which was 12.7 × 12.7 cm. The sheet was then tested for oxygen index in accordance with the procedure of ASTM-D2863-74. The polyethylene had an oxygen index of 19.1. A replicate sample of polyethylene was prepared containing 13.75 parts of the bis(4-bromobutyl)fumarate/vinyl acetate copolymer of Example III. Testing of the sample containing the copolymer plasticizer showed that the sample had an oxygen index of 23.1. The polyethylene used was Monsanto 6003 high density polyethylene.

It is contemplated that similar results would be afforded by incorporating the described flame retardant plasticizer in polypropylene, vinyl halide polymers such as polyvinyl chloride and vinyl chloride copolymers, polymerized esters of acrylic and methacrylic acids, polymerized esters of carbonic acid, acrylonitrile polymers, diolefin polymers such as polybutadiene, polychloroprene, and polyisoprene, and butyl rubbers.

EXAMPLE VI

This example illustrates the effectiveness of a copolymer of bis(4-bromobutyl)fumarate and triallyl cyanurate as a flame retardant plasticizer for polystyrene (Monsanto LUSTREX high impact polystyrene).

Standard UL-94 specimens were prepared and subjected to the UL-94 vertical burn test to characterize ignition and combustion. Each of five specimens contained 15% by weight copolymer of bis(4-bromobutyl)fumarate/triallyl cyanurate.

Subjection of the specimens to the test conditions of UL-94 afforded a rating of V-0. The average burn time of the five specimens, with two ignitions each, was 3.7 seconds. Replicate control samples, not containing the described copolymer, burned.

It is contemplated that similar results would be obtained by incorporating the described flame retardant plasticizer in polyesters, polyurethanes, phenolics, aminoplasts and polyamides.

The flame retardant plasticizer compounds of the present invention are useful as flame retardants for a wide variety of natural and synthetic polymer materials.

Synthetic polymer materials, i.e., those high molecular weight organic materials which are not found in nature, with which the compounds of the invention are advantageously employed may be either linear or cross-linked polymers and may be in the form of sheets, coatings, foams and the like. They may be either those which are produced by addition or condensation polymerization.

An important class of polymers which are beneficially flame retarded with the compounds of the invention are those obtained from a polymerizable monomer compound having ethylenic unsaturation. A particularly preferred class of polymers which are flame retarded consist of the polymerized vinyl and vinylidene compounds, i.e., those having the $CH_2=C<$ radical. Compounds having such a radical are, for example, the solid polymeric alkenes, such as polyethylene, polypropylene, polyisobutylene or ethylene/propylene copolymers; polymerized acrylyl and alkacrylyl compounds such as acrylic, fluoroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate, 2-(cyanoethoxy)ethyl or 3-(3-cyanopropoxy)propyl acrylate or methacrylate, 2(diethylamino)ethyl or 2-chloroethyl acrylate or methacrylate, acrylic anhydride or methacrylic anhydride; methacrylamide or chloroacrylamide; ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene; polyvinyl alcohol; the vinyl carboxylates such as vinyl acetae, vinyl chloroacetate, vinyl propionate, and vinyl 2-ethyl-hexanoate; the N-vinyl imides such as N-vinyl phthalimide and N-vinyl succinamide; the N-vinyl lactams such as N-vinyl caprolactam and N-vinyl butyrolactam; vinyl aromatic hydrocarbon compounds such as styrene, alpha-methylstyrene, 2,4-dichlorostyrene, alpha- or beta-vinylnaphthalene, divinyl benzene and vinyl fluorene; the vinyl ethers such as ethyl vinyl ether or isobutyl vinyl ether; vinyl-substituted heterocyclic compounds such as vinyl pyridine, vinyl pyrrolidone, vinylfuran or vinylthiophene; the vinyl or vinylidene ketones such as methyl vinyl ketone or isopropenyl ethyl ketone; vinylidene cyanide. Homopolymers of the above compounds or copolymers and terpolymers thereof are beneficially flame retarded by the compounds of the present invention. Examples of such copolymers or terpolymers are those obtained by polymerization of the following monomer mixtures: vinyl chloride/vinyl acetate; ethylene/vinyl chloride/vinyl acetate, acrylonitrile/vinyl pyridine, styrene/methyl methacrylate, styrene/N-vinyl pyrrolidone, cyclohexyl methacrylate/vinyl chloroacetate, acrylonitrile/vinylidene cyanide, methyl methacrylate/vinyl acetate, ethyl acrylate/methacrylamide/ethyl chloroacrylate, vinyl chloride/vinylidene chloride/vinyl acetate.

Other polymers of compounds having the ethylenic group, $>C=C<$, are homopolymers, copolymers and terpolymers of the alpha-, beta-olefinic dicarboxylic acids and derivatives thereof such as the anhydrides, esters, amides, nitriles and imides, for example, methyl, butyl, 2-ethylhexyl or dodecyl fumarate or maleate; maleic, chloromaleic, citraconic or itaconic anhydride; fumaronitrile, dichlorofumaronitrile or citracononitrile; fumaramide, maleamide or N-phenyl maleamide. Examples of particularly useful polymers and terpolymers prepared from the alpha-, beta-olefinic dicarboxylic compounds are the copolymers of maleic anhydride and a vinyl compound such as ethylene, propylene, isobutylene, styrene, alpha methylstyrene, vinyl acetate, vinyl propionate, methyl isopropenyl ketone, isobutyl vinyl ether, the copolymers of dialkyl fumarate such as ethyl or butyl fumarate and vinyl compounds such as styrene, vinyl acetate, vinylidene chloride, ethyl methacrylate, acrylonitrile and the like.

The compounds of the invention act as flame retardant plasticizers for the polymers and copolymers of unsaturated, cyclic esters of carbonic acid, for example, homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily flame retarded by the compounds of the invention are the polyarylcarbonate polymers such as the linear polyarylcarbonates formed from diphenols or dihydroxy aromatic compounds including single and fused-ring nuclei with two hydroxy groups as well as monohydroxy-substituted aromatic residues joined in pairs by various connecting linkages. Examples of the foregoing include dihydroxy benzenes, naphthalenes and the like, the dihydroxydiphenyl ethers, sulfones, alkanes, ketones and the like.

The compounds of the invention also act as flame retardants for polymers, copolymers or terpolymers of polymerizable compounds having a plurality of double bonds, for example, rubbery, conjugated diene polymerizates such as homopolymerized 3-butadiene, 2-chlorobutadiene or isoprene and linear copolymers or terpolymers such as butadiene/acrylonitrile, isobutylene/butadiene, butadiene/styrene; esters of saturated di- or poly-hydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the crosslinked polymeric materials such as methyl methacrylate/diallyl methacrylate copolymer or butadiene/styrene/divinyl benzene terpolymer.

The cellulose derivatives are flame retarded by the compounds of the present invention. For example, cellulose esters such as cellulose acetate, cellulose triacetate or cellulose butyrate, the cellulose ethers such as methyl or ethyl cellulose, cellulose nitrate, carboxymethyl cellulose, cellophane, rayon regenerated rayon and the like may be flame retarded.

The compounds of the present invention are well suited for flame retarding liquid resin compositions of the polyester type, for example, the linear polyesters which are obtained by the reaction of one or more polyhydric alcohols with one or more alpha-, beta-unsaturated polycarboxylic acids alone or in combination with one or more saturated polycarboxylic acid compounds, or the crosslinked polyester resins which are obtained by reacting a linear polyester with a compound containing a $CH_2 = C<$ group.

The compounds of the present invention are compatible flame retardants for epoxy resins. Such resins are condensation products formed by the reaction of a polyhydroxy compound and epichlorohydrin, which condensation products are subsequently cured by the addition of crosslinking agents. The hydroxy compounds may be, for example, ethylene glycol, 4,4'-isopropylidenediphenol and similar materials. The crosslinking agent employed in the curing step may be a dicarboxylic compound such as phthalic anhydride or adipic acid, but is more generally a polyamine such as ethylene, diamine, paraphenylamine diamine or diethylene triamine.

Polyurethanes are a class of polymer materials which are flame retarded by the compounds of the present invention. The polyurethanes, like the above-mentioned polyesters, are materials which are employed in structural applications, for example, as insulating foams, in the manufacture of textile fibers, as resin bases in the manufacture of curable coating compositions and as impregnating adhesives in the fabrication of laminates of wood and other fibrous materials. Essentially, the polyurethanes are condensation products of a diisocyanate and a compound having a molecular weight of at least 500 and preferably about 1,500 – 5,000, and at least two reactive hydrogen ions. The useful active hydrogen-containing compounds may be polyesters prepared from polycarboxylic acids and polyhydric alcohols, polyhydric polyalkylene ethers having at least two hydroxy groups, polythioether glycols, polyesteramides and similar materials.

The polyesters or polyester amides used for the production of the polyurethane may be branched and/or linear, for example, the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric or itaconic acids with polyalcohols such as ethylene glycol, diethylene glycol, pentaglycol, glycerol, sorbitol, triethanolamine and/or amino alcohols such as ethanolamine, 3-aminopropanol, and with mixtures of the above polyalcohols and amines.

The alkylene glycols and polyoxyalkylene or polythioalkylene glycols used in the production of polyurethanes may be ethylene glycol, propylene glycol, butylene glycol, diethylene glycol, triethylene glycol, polythioethylene glycol, dipropylene glycol and the like.

Generally, any of the polyesters, polyisocyanatemodified polyesters, polyester amides, polyisocyanate-modified polyester-amides, alkylene glycols, polyisocyanate-modified alkylene glycols, polyoxyalkylene glycols and polyisocyanatemodified polyoxyalkylene glycols having three reactive hydrogen atoms, three reactive carboxylic and/or especially hydroxyl groups may be employed in the production of polyurethanes. Moreover, any organic compound containing at least two radicals selected from the group consisting of hydroxy and carboxy groups may be employed.

The organic polyisocyanates useful for the production of polyurethanes include ethylene diisocyanate, ethylidene diisocyanate, propylene-1,2-diisocyanate, m-phenylene diisocyanate, 2,4-tolylene diisocyanate, triphenylmethane triisocyanate, or polyisocyanates in blocked or inactive form such as the bis-phenyl carbamates of tolylene diisocyanate and the like.

Phenolic resins are flame retarded by the compounds of the present invention, which compounds may be incorporated into the phenolic resin either by milling and molding applications or by addition to film-forming or impregnating and bonding solutions prior to casting. Phenolic resins with which the present compounds are employed are, for example, the phenol-aldehyde resins prepared from phenols such as phenol, cresol, xylenol, resorcinol, 4-butylphenyl, cumylphenol, 4-phenylphenol, nonylphenol, and aldehydes such as formaldehyde, acetaldehyde or butyraldehyde in the presence of either acetic or basic catalysts, depending upon whether the resin is intended for use as a molding or extruding resin or as the resin base in coating and impregnating compositions.

Aminoplasts are another group of aldehyde resins which are flame retarded by the compounds of the invention. Examples of aminoplasts are the heat-convertible condensation products of an aldehyde with urea, thiourea, guanidine, cyanamide, dicyandiamide, alkyl or aryl guanamines and the triazines such as melamine, 2-fluoro-4,6-diamine-1,3,5-triazine and the like. When the aminoplasts are to be used as impregnating agents, bonding adhesives, coatings and in casting of films, the compounds of the present invention are incorporated into solutions or suspensions in which the aminoplast is carried. The resulting mixtures give strong, fireretardant laminates when sheets of paper, glass, cloth or fabric are impregnated therewith and cured.

Another class of compounds which are flame retarded by the compounds of the present invention are the nylons, for example, the superpolyamides which are generally obtained by the condensation of a diamine, for example, hexamethylene diamine with a dicarboxylic acid, for example, adipic acid.

Other polyamides which are flame retarded in accordance with the present invention are the polypeptides which may be prepared, for example, by reaction of N-carbobenzyl oxyglycine with glycine or mixtures of glycine and lysine or an N-carboxy amino acid anhydride such as N-carboxy-DL-phenylalanine anhydride, piperidone, 2-oxohexamethyleneimine and other cyclic amides. The compounds of the present invention can be incorporated into molding or extruding compositions for a flame retardant effect.

The compounds of the present invention are also useful as flame retardants for linear polymers obtained by the selfcondensation of bifunctional compounds, for example, the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid; the polyamides which are prepared by the self-condensation of aminocarboxylic acids such as 4-aminobutyric acid; the polyanhydrides which are formed by the self-condensation of dicarboxylic acids such as sebacic or adipic acid.

The preferred synthetic polymer materials which are flame retarded by the compounds of the present invention are the vinyl halide polymers in the form of milled products, plastisols and foams, polystyrene, polyolefins, e.g., polyethylene, rigid and flexible polyurethane coatings and foams, epoxy resins, and GRS rubbers. The vinyl halide polymers can be simple homopolymers of vinyl chloride or vinylidene chloride, such as polyvinyl chloride or polyvinylidene chloride, or copolymers or terpolymers in which the essential polymeric structure of polyvinyl chloride is interspersed at intervals with residues of other ethylenically unsaturated compounds copolymerizable therewith. The essential properties of the polymeric structure of polyvinyl chloride is retained if not more than about 40 percent of a comonomer is copolymerized therewith. Especially preferred copolymers include ethylene/vinyl chloride and vinyl chloride/acrylonitrile copolymers. Especially preferred terpolymers include ethylene/vinyl chloride/acrylonitrile, ethylene/vinyl chloride/acrylic acid and ethylene/vinyl chloride/acrylamide terpolymers.

Natural polymeric materials which may be flame retarded by the compounds of the present invention include natural rubber, cellulose esters, for example, cellulose acetate and cellulose nitrate, ethyl cellulose, cork and wood flour products and similar cellulosic materials.

The polymer formulations which are flame retarded in accordance with the present invention, whether in sheet or film form or of foam or molded structure, may contain various conventional additives such as fillers, extenders, crosslinking agents and colorants. Minor amounts of stabilizers, for example, are usually incorporated to reduce the effects of heat and light.

When foamable compositions are used, the composition may be a self-blowing polymer or the polymer may be blown by chemical or mechanical means or by the use of compressed gas. Fillers which are frequently employed to lower the cost of the finished material and to modify its properties include calcium carbonate and magnesium silicate. When fillers are employed, they are generally present in an amount of up to about 150 parts by weight of filler per 100 parts by weight of polymer formulation.

Where a colored or tinted composition is desired, colorants or color-pigments are incorporated in amounts of from about one to about five parts by weight to 100 parts by weight of polymer.

Surfactants such as silicones are normally added to foam formulations which are mechanically frothed. The surfactants reduce the surface tension of the foam and thereby increase the air or gas entrapment characteristics of the foam.

Additionally, glass forming inorganic materials such as zinc borate, zinc oxide, lead oxide, lead silicate and silicon dioxide may be added to decrease the flame and smoke generating characteristics of the polymer.

Additionally, the flame retardant plasticizers may be utilized in conjunction with the oxides, hydroxides, hydrates or salts of metals such as aluminum, magnesium, calcium, antimony, vanadium, chromium, molybdenum, tungsten, manganese, iron, cobalt, nickel, palladium, platinum, copper, zinc, mercury, germanium, tin and lead.

The ω-bromoalkyl esters of the invention may also be combined, either alone or in admixture with the described metal compounds, with other flame retardant and smoke retardant materials and char-forming materials, such as with ethylene/maleic anhydride adducts and complexes or salts thereof, with metals and metal salts such as iron, antimony, tin, zinc and copper, with adducts of furan and maleic anhydride and brominated derivatives thereof. Also, ω-bromoalkyl esters of monocarboxylic acids may be combined with the esters of the present invention.

We claim:
1. Copolymer of the formula

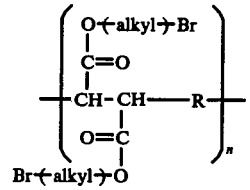

wherein R is the monomeric unit derived from the polymerization of an ethylenically unsaturated comonomer the reactivity value of which, when multiplied by the reactivity value of diethyl fumarate, is less than one and n has a value of from about 10 to about 2,000.

2. Copolymer of claim 1 wherein said alkyl is butyl.
3. Copolymer of claim 1 wherein said comonomer is triallyl cyanurate.
4. Copolymer of claim 1 wherein said comonomer is vinyl acetate.
5. Copolymer of claim 1 wherein said comonomer is ethyl acrylate.
6. Copolymer of bis(4-bromobutyl)fumarate and triallyl cyanurate.
7. Copolymer of bis(4-bromobutyl)fumarate and vinyl acetate.
8. Copolymer of bis(4-bromobutyl)fumarate and ethyl acrylate.

* * * * *